Figure 1:
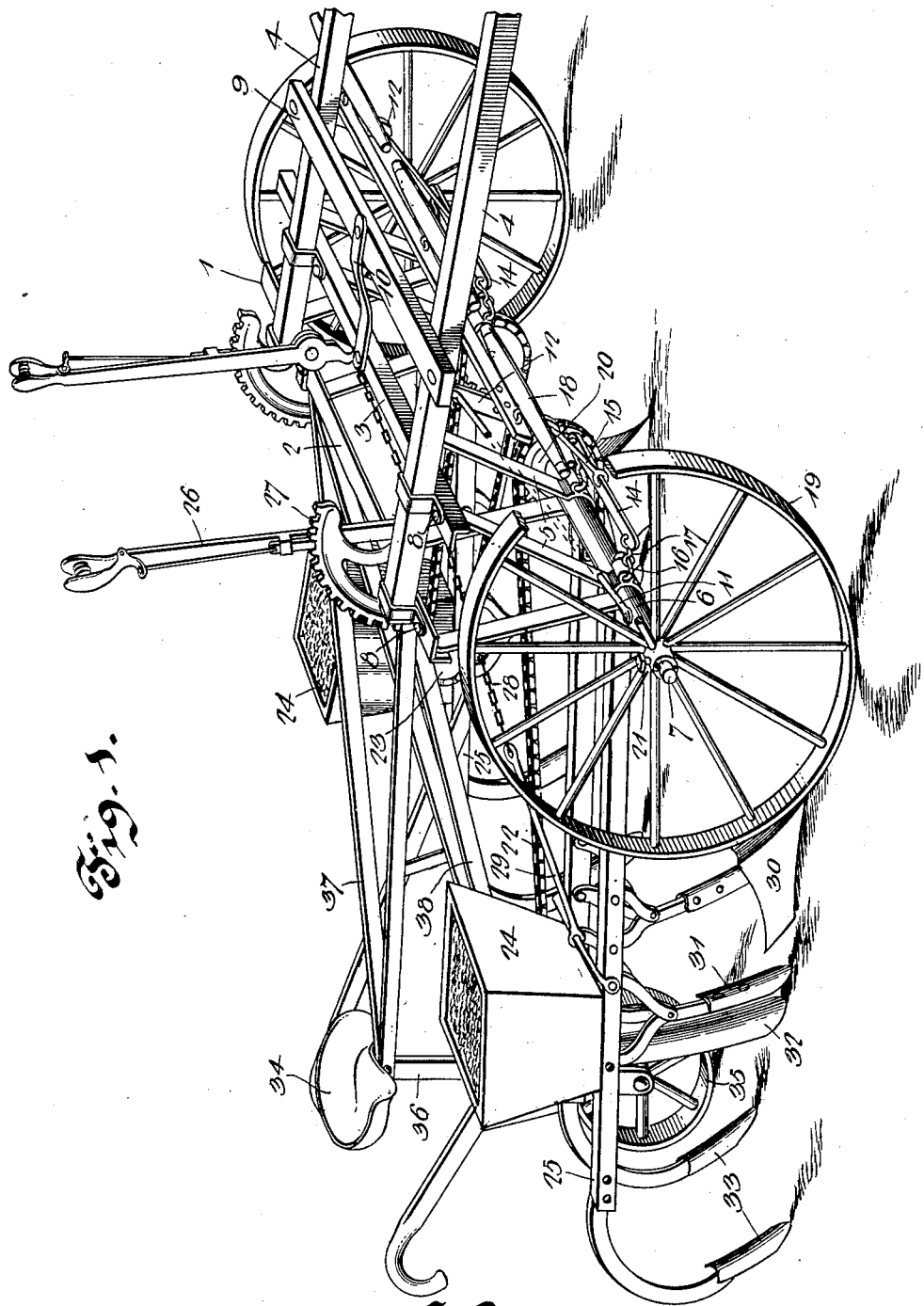

No. 660,599. Patented Oct. 30, 1900.
S. G. SVENSEN.
PLANTER AND CULTIVATOR.
(Application filed June 27, 1899.)
(No Model.) 2 Sheets—Sheet I.

Witnesses
S. G. Svensen, Inventor.
by C. A. Snow & Co.
Attorneys

No. 660,599.  
Patented Oct. 30, 1900.  
S. G. SVENSEN.  
PLANTER AND CULTIVATOR.  
(Application filed June 27, 1899.)  
(No Model.)  
2 Sheets—Sheet 2.
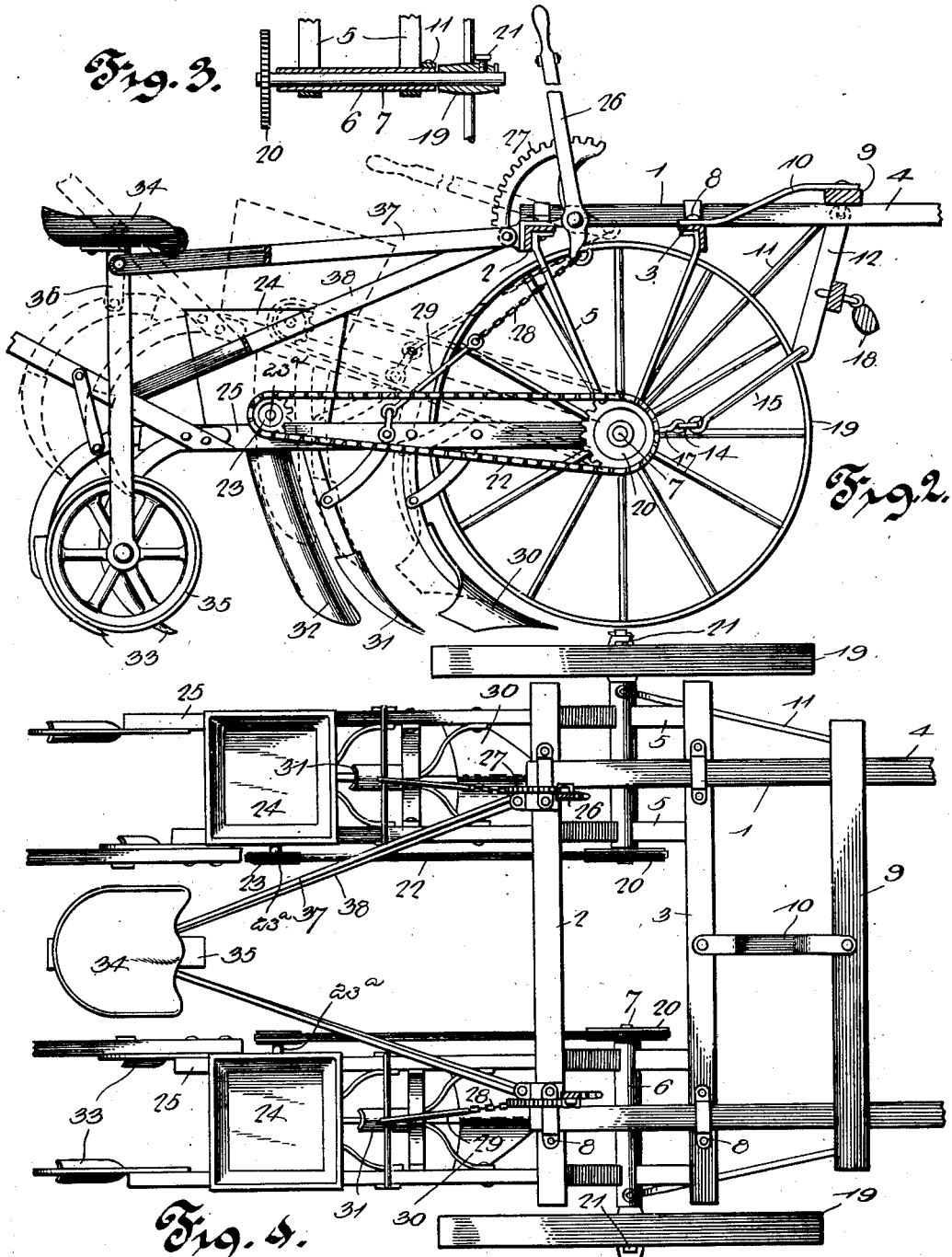

UNITED STATES PATENT OFFICE.

SVEND G. SVENSEN, OF TAYLOR, TEXAS.

PLANTER AND CULTIVATOR.

SPECIFICATION forming part of Letters Patent No. 660,599, dated October 30, 1900.

Application filed June 27, 1899. Serial No. 722,038. (No model.)

*To all whom it may concern:*

Be it known that I, SVEND G. SVENSEN, a citizen of the United States, residing at Taylor, Williamson county, Texas, have invented an Improvement in a Combined Planter (cotton and corn) and Cultivator, of which the following is a specification.

The invention relates to improvements in planters and cultivators.
The object of the present invention is to improve the construction of cultivators and planters and to provide a comparatively-inexpensive one adapted to have the planting devices removed to change it to a cultivator, so that after corn or cotton has been planted it may be cultivated.

The invention consists in the construction and novel combination and arrangement of parts hereinafter fully described, illustrated in the accompanying drawings, and pointed out in the claims hereto appended.

In the drawings, Figure 1 is a perspective view of a machine constructed in accordance with this invention and arranged for planting. Fig. 2 is a longitudinal sectional view. Fig. 3 is a transverse sectional view. Fig. 4 is a plan view.

Like numerals of reference designate corresponding parts in all the figures of the drawings.

1 designates an arched frame composed of transverse connecting-bars 2 and 3, longitudinal bars 4; and depending substantially V-shaped loops or arms 5, designed to be adjustably connected at the upper terminals of their sides to the transverse bars 2 and 3 and provided at their bottoms or apexes with bearings receiving horizontal sleeves 6, in which are journaled short shafts 7. The loops or arms are shaped at the bottom to conform to the configuration of the sleeves and are connected above the same by fastening devices 8. The longitudinal bars are connected in advance of the bar 3 by a cross-bar 9, which is connected with the said bar 3 by a central brace 10, and its ends are extended beyond the longitudinal bars and are connected with the outer ends of the sleeves by inclined bracing-rods 11. The extended ends of the cross-bar 9 also support depending bars 12, with which the draft mechanism is connected and which are connected with the axles by flexible connections consisting of transverse bars 14, central upwardly-extending links 15, and rearwardly-extending side links 16 and 17. The central upwardly-extending links are connected with the transverse bars 14 at the center thereof, and the links 16 and 17 extend from the ends of the transverse bars to the axles and are flexibly connected at their adjacent ends. The draft mechanism may be arranged in any suitable manner, and instead of employing three singletrees 18, as illustrated in the accompanying drawings, more or less may be used, as will be readily apparent.

The axles receive carrying-wheels 19 on their outer ends and are provided at their inner ends with sprocket-wheels 20, which are rotated by the said carrying-wheels when the latter are fixed to the axles by means of clamping-screws 21, mounted on the hubs of the wheels, near the outer ends thereof, and adapted to be adjusted to enable the wheels to turn independently of the axles and to make them rigid with the same. The sprocket-wheels 20 are connected by sprocket-chains 22 with sprocket-wheels 23, mounted on the shaft 23ª, and arranged at the inner sides of seed-hoppers 24 and connected with the mechanism for feeding the seed and for causing the same to be discharged uniformly. The seed-hoppers are mounted upon frames 25, and the feeding devices, which may be of any desired construction, are not illustrated, as they do not form any part of the present invention. A pair of frames 25 is employed, and each frame, which extends rearward from one of the axles, is hinged at its front end to the same and is composed of longitudinal bars or beams and is adapted to swing upward and downward to elevate it to the position illustrated in dotted lines in Fig. 2 and to lower it to the ground to the position shown in full lines in the said figure. The hinged frames 25 may be adjusted transversely of the machine by adjusting the loops or arms 5 on the transverse bars 2 and 3 of the arched frame. The hinged frames are adjusted by means of levers 26, fulcrumed between their ends on the arched frame and provided with a suitable spring-actuated detent or pawl for engaging a curved ratchet 27. The lower end of the lever 26 is suitably connected with the adjacent hinged frame, preferably by means of a chain 28 and a rod 29, and when the lever is swung downward the hinged frame will be swung upward from the ground.

Each hinged frame carries a double plow 30, which is adapted to throw off a thin layer of the soil in the usual manner, and a furrow-opener 31 is located in rear of the plow and in advance of the seed-tube 32. After the seed is deposited in the furrow it is covered by a pair of rear shovels 33, connected with the beams of the frame 25, at the rear ends thereof. The hinged frames, which are provided with suitable handles, may be entirely removed after the operation of planting has been completed, and other frames having cultivating devices may be substituted for them.

A seat 34 is provided for the accommodation of the driver and is supported by a caster-wheel 35, which is mounted in a fork or bifurcation of a standard 36, and the latter is connected at its upper and lower portions by braces 37 and 38, which are substantially V-shaped.

What I claim is—

1. In a machine of the class described, the combination of the arched frame having depending arms, axles journaled on the arms, carrying-wheels arranged at the outer ends of the axles and provided with means for engaging the same, whereby they may be arranged either fast or loose on the axles, rearwardly-extending frames hingedly connected with the axles, seed-hoppers mounted on the hinged frames and designed to be provided with suitable feed mechanism and having sprocket-wheels, sprocket-wheels mounted on the axles, sprocket-chains connecting the sprocket-wheels of the axles, and the seed-hoppers, and adjusting devices for raising and lowering the hinged frames, substantially as described.

2. In a machine of the class described, the combination of the arched frame having depending arms, axles journaled on the arms, carrying-wheels arranged at the outer ends of the axles and provided with means for engaging the same, whereby they may be arranged either fast or loose on the axles, rearwardly-extending frames hingedly connected with the axles, seed-hoppers mounted on the hinged frames and designed to be provided with suitable feed mechanism and having sprocket-wheels, sprocket-wheels mounted on the axles, sprocket-chains connecting the sprocket-wheels of the axles, and the seed-hoppers, adjusting devices for raising and lowering the hinged frames, a standard arranged between the hinged frames and located in rear of the arched frame and provided with a seat, a wheel supporting the standard, and braces connecting the standards with the arched frame, substantially as described.

3. In a machine of the class described, the combination of an arched frame, axles journaled on the arched frame, carrying-wheels arranged at the outer ends of the axles and provided with means for engaging the same, whereby they may be made fast or loose on the same, rearwardly-extending frames hingedly connected with the axles, hoppers mounted on the hinged frames and designed to be provided with suitable feed mechanism, gearing extending from the hoppers to the inner ends of the axles, adjusting devices for raising and lowering the hinged frames, a standard arranged between the hinged frames in rear of the arched frame, and provided with a seat, a wheel supporting the standard, and braces connecting the standard with the arched frame, substantially as described.

SVEND G. SVENSEN.

Witnesses:
T. B. HYDE,
C. H. SCHNELL.